Inventors:
George E. Denman
Catherine E. Denman

UNITED STATES PATENT OFFICE

1,937,875

GASEOUS FUEL MIXER

George E. Denman and Catherine E. Denman, Oakland, Calif.

Application July 23, 1932. Serial No. 624,326

1 Claim. (Cl. 48—180)

The invention relates to improvement in auxiliary gaseous fuel mixers, adapted to be mounted between the flanges of an intake manifold and carburetor of an internal combustion engine, and which interconnects these parts; and the object of our invention is to provide facilities for more thoroughly atomizing the gasoline and mixing it with air than can be done by the average carburetor alone; the result being a superior mixture, greater engine efficiency and economy in operation.

It is well known that the average carburetor does not completely atomize the gasoline but that large drops of raw fuel enter the manifold of an engine, and a considerable portion of it enters the combustion chamber in the raw state and does not burn, it merely runs down the cylinder walls into the crankcase diluting the oil, causing waste. Due to the special design and construction of our mixing element, which we designate the baffle plate, the above mentioned drops of raw fuel strike the twisted blades and are broken into smaller drops and, due to the cyclonic action created by the twisted blades, combined with the important channel in the central hub of said baffle plate, these smaller drops are thoroughly atomized by the friction of the cyclonic currents which pass around between, and against said blades.

Our auxiliary gaseous fuel mixer is adapted to be detachably mounted between the flanges of an intake manifold and a carburetor; it has no moving parts which can wear out or come apart; the design and pitch of the blades permit free circulation of the gaseous fuel with the least possible obstruction or restriction, at the same time, the blades being twisted a quarter turn to the horizontal they provide excellent deflecting devices which completely break up the gasoline without waste.

While the drawing illustrates an embodiment of the invention, it is to be understood that in adapting the same to meet different requirements, various changes in form, proportions and minor details may be resorted to without departing from the nature of the invention or sacrificing any of its advantages.

Figure 1:
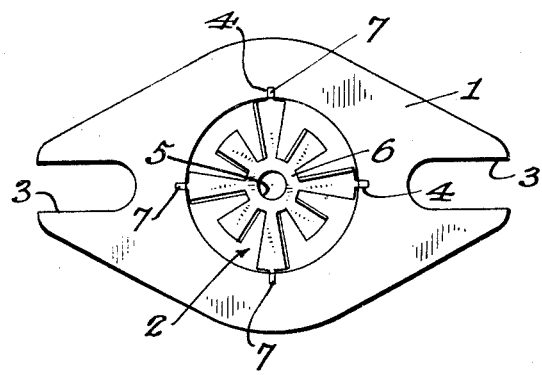
Figure 1 is a plan view of the entire device.
Figure 2:
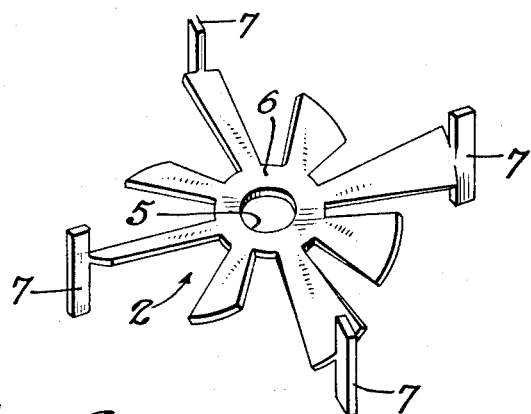
Figure 2 is a perspective view of the baffle plate.

Our gaseous fuel mixer comprises a gasket member 1 Figure 1. Said gasket member 1 has an open slot 3 at each end to admit a suitable bolt with which to fasten the device in place. A baffle plate 2 is detachably mounted within the gasket member 1. The plate 2, as seen in Fig. 2, consists of a single piece of thin sheet metal designed to form a plurality of alternately long and short blades equally spaced from each other and radiating from a perforated central hub 6. The blades increase in width towards their outer ends, and are twisted a quarter of a turn to the horizontal, thus forming a plurality of deflecting devices and a corresponding number of fuel channels. This novel construction of the mixing element permits free circulation of the gaseous fuel with the least obstruction or restriction to flow. At the same time it provides a means for completely breaking up the fuel. A reduced extension 7 on each of the longer blades detachably secures the baffle plate 2 to the gasket member 1, fitting in the slots 4. A light blow from a hammer closes slots 4 and holds the baffle plate firmly in place.

Ordinarily the gaseous mixture drawn through the average carburetor is thrown to one side of the passageway, whereas with our improved method the mixture is deflected by the twisted blades in such a manner as to cause it to whirl in cyclonic fashion; channel 5 gives a straight lift to a portion of the mixture and permits a stream of said mixture to rise through the center of the baffle plate and said stream comes in contact with the vortex of the cyclonic action, mixing with the whirling currents which pass around, between and against the twisted blades, which violent action completely breaks up, atomizes and mixes the gaseous fuel thereby producing a superior mixture, the result being better combustion, increased engine power and economy of operation.

We claim as our invention:

A gas mixing device adapted to be mounted between the flanges of an intake manifold and carburetor, said mixing device comprising a gasket member, a baffle plate detachably mounted within the gasket member comprising a plurality of alternately long and short blades equally spaced from each other and radiating from a perforated central hub, said blades increasing in width towards their outer ends and twisted a quarter of a turn to the horizontal, a reduced extension on each of the longer blades for detachably securing said plate to the gasket member.

GEORGE E. DENMAN.
CATHERINE E. DENMAN.